United States Patent [19]

Byrne et al.

[11] Patent Number: 4,763,056

[45] Date of Patent: Aug. 9, 1988

[54] POWER SUPPLY SYSTEMS FOR RELUCTANCE MOTORS

[75] Inventors: John V. Byrne, Dalkey; Jeremiah B. O'Dwyer, Naas, both of Ireland

[73] Assignee: Kollmorgen Technologies Corporation, Dallas, Tex.

[21] Appl. No.: 816,866

[22] Filed: Jan. 7, 1986

[30] Foreign Application Priority Data

Jan. 15, 1985 [IE] Ireland .................................... 92/85

[51] Int. Cl.⁴ ............................................... H02P 5/40

[52] U.S. Cl. ..................................... 318/701; 318/138

[58] Field of Search ......................... 318/701, 138, 254

[56] References Cited

U.S. PATENT DOCUMENTS

| | | | |
|---|---|---|---|
| 3,401,323 | 9/1968 | French | 318/254 |
| 3,560,817 | 2/1971 | Amato | 318/138 |
| 3,639,818 | 1/1972 | Wiart | 318/138 |
| 3,678,352 | 7/1972 | Bedford | 318/138 |
| 3,679,953 | 7/1972 | Bedford | 318/138 |
| 4,253,053 | 2/1981 | Ray et al. | 318/701 |

FOREIGN PATENT DOCUMENTS

| | | |
|---|---|---|
| WO83/00957 | 3/1983 | Int'l Pat. Institute . |
| 469394 | 4/1969 | Switzerland . |
| 1364679 | 8/1974 | United Kingdom . |
| 2105536 | 3/1983 | United Kingdom . |

*Primary Examiner*—David Smith, Jr.
*Attorney, Agent, or Firm*—Morgan & Finnegan

[57] ABSTRACT

In a power supply system for a variable reluctance motor, each phase winding of the motor is connectible across a pair of supply rails by first and second switch means located respectively between the first supply rail and the winding and between the winding and the second supply rail. The first switch means is a fast switch-off device such as a gate turn-off thyristor or a transistor, while the second switch means is a slow turn-off device, such as a thyristor suitable for application to a line-commutation situation. In a two-phase configuration, where the second switch means is a thyristor, force-commutation of the second switch means may be achieved by means of a suitable capacitor interconnection between the thyristors switching the respective phases.

5 Claims, 4 Drawing Sheets

POWER SUPPLY SYSTEMS FOR RELUCTANCE MOTORS

BACKGROUND OF THE INVENTION

1. Field of the Invention

This invention relates to power supply systems for reluctance motors. In particular, the invention relates to power supply systems for two phase reluctance motors.

2. Description of the Prior Art

Power circuits previously proposed for and applied to reluctance motor systems for industrial drive applications have, in general, failed to show significant savings over comparable systems for induction or synchronous machines.

In at least some such circuits, this has been due to the use of expensive fast switch-off devices on both sides of each phase winding. In other arrangements, in which the phase windings have been arranged so that each is exposed to only one-half of the rail-to-rail voltage of the power supply, the resulting reduction in the number of devices has been offset by operational or performance limitations.

BRIEF SUMMARY OF THE INVENTION

It is an object of the present invention to provide an economical power supply circuit for a reluctance motor drive system, in which both the number of switching devices and their cost is substantially minimised. A further objective of the invention is the provision of such a circuit in which the number of fast switch-off devices is also substantially minimised.

According to the invention, there is provided a power supply system for a reluctance motor having (a) first and second supply rails between which the or each phase winding of a reluctance motor may be connected, (b) first switch means for connecting the or each said phase winding to one of said supply rails, and (c) second switch means for connecting the or each said phase winding to the other of said supply rails, wherein the or each said first switch means is a fast switch-off device and the or each said second switch means is a slow switch-off device. Thus the or each said second device or means may be of a lower grade than the or each said first device or means and their cost may thereby be reduced. For the purposes of the present description, a slow turn-off or switch-off device may be regarded as one which is characterised by a relatively long turn-off time, such as may find application in a line-commutation situation. A fast turn-off device, by contrast, is one which is capable of PWM switching and may thus find application in controlling not only the duration of energisation of a magnetising winding of a reluctance motor but also the waveshape of the exciting current.

The or each said first switch means may be a GTO thyristor or a transistor. An associated fast turn-off diode may be provided for the or each said first switch means for PWM switching.

The or each said second switch means may be a slow turn-off thyristor and an associated slow diode may be provided for the or each said second switch means to allow one switching action of said slow turn-off thyristor for each excitation of the respective phase winding.

In a favoured embodiment of power supply system according to the invention for application to a two-phase reluctance motor, the system has two said first switch means and two said second switch means, and commutation means for switch-off of said second switch means are defined by a capacitor interconnecting the point of connection of each slow turn-off thyristor to a respective phase winding of the motor, so that each said slow turn-off thyristor is force-commutated by energisation of a phase winding other than that which it connects to said other supply rail in its switched-on condition.

Alternatively the or each said second switch means may be commutated from a further auxiliary rail via a low-power thyristor and a transistor.

Preferably said power supply system according to the invention has two said first switch means and two said second switch means, for application to a two-phase reluctance motor. Each said second device is force-commutated by energisation of the other phase winding. A four-phase motor may be powered by two two-phase power supplies according to the invention operating side by side, while in a still further variant, a single-phase power supply incorporating the principles of the invention may also be provided.

BRIEF DESCRIPTION OF THE DRAWINGS

The disadvantages of certain known power supply circuits in regard to device count and cost are now discussed having regard to FIGS. 1 to 5 of the accompanying drawings and the invention is then described in relation to FIGS. 6 to 8 of the drawings. In the drawings.

DETAILED DESCRIPTION OF THE DRAWINGS

Figure 1:
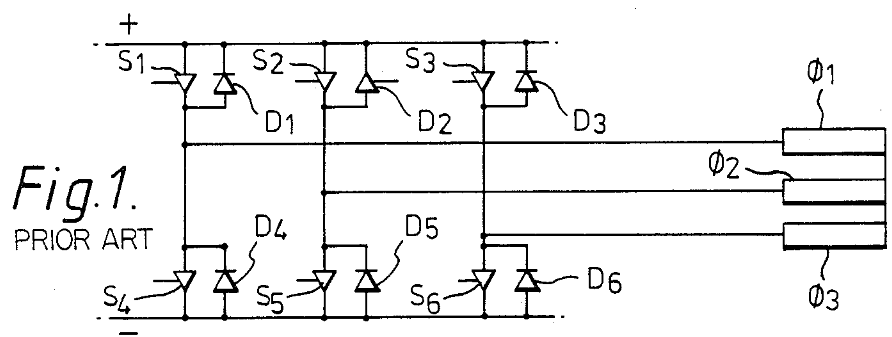
FIG. 1 shows a known power circuit for a three-phase induction or synchronous machine.

In FIGS. 1 to 5, a variety of conventional or known power supply circuits are shown. These are discussed in the following paragraphs, subsequent to which the invention is described and explained having regard to FIGS. 6 to 8. In FIG. 1, a conventional power circuit for an induction motor or synchronous machine is depicted, in which three phase windings $\phi$1, $\phi$2 and $\phi$3 are fed in sequence by switch devices $S_1$ to $S_6$, each of which is associated with a respective diode $D_1$ to $D_6$.

Figure 2:
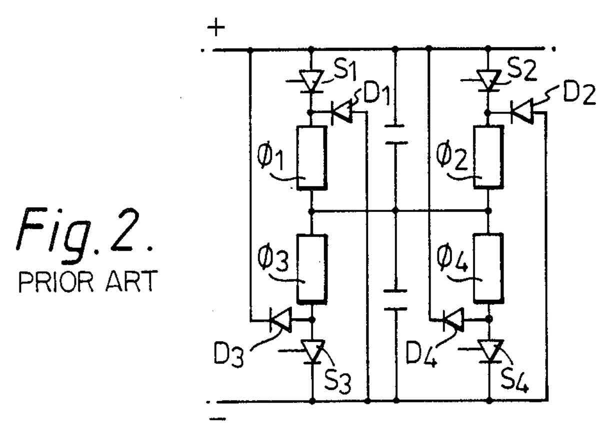
FIG. 2 shows a known power circuit for a four-phase reluctance motor.

A known power circuit arrangement for a reluctance motor is shown in FIG. 2, in which the windings of a four-phase machine are connected in pairs across the supply rails and each pair of windings is energised by a respective pair of switches. Thus the rail voltage is split, and each winding is energised or de-energised at one-half of the full rail voltage.

Figure 3:
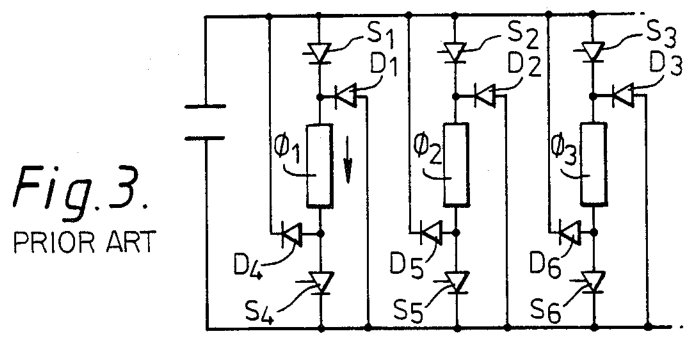
FIG. 3 shows a known power circuit for a three-phase reluctance motor.

A further known arrangement is shown in FIG. 3, for a three-phase reluctance machine, in which each phase winding sees the full rail voltage and is switched on and off by a pair of devices interposed respectively between the top or positive rail and the winding and between the winding and the bottom or negative rail.

Figure 4:
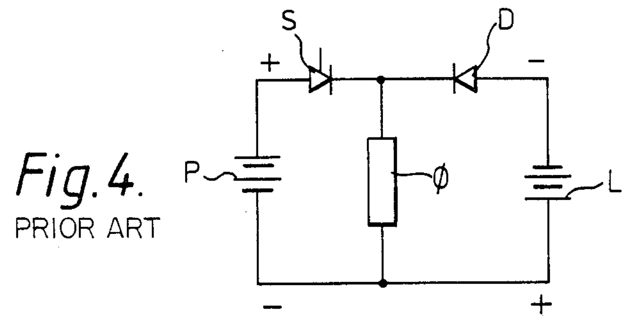
FIG. 4 shows, for one phase only of a multi-phase system, a known arrangement in which a de-energising voltage is applied to a main device by an auxiliary rail or sink.

In the known arrangement shown in FIG. 4 for a single phase only of a multi-phase configuration, the phase winding is energised from a source P by the device S, and a de-energising voltage is presented through device D from a sink L. Sink L may alternatively be an auxiliary rail.

Figure 5:
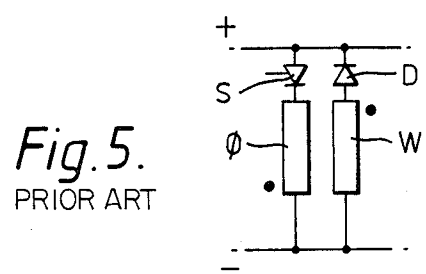
FIG. 5 shows a further known arrangement, again for a single phase of a multi-phase system, in which a de-energising voltage is applied to a main device by means of a winding of reversed sense, FIGS. 6(*a*) and 6(*b*) shows a first embodiment of power circuit according to the invention for a two-phase reluctance machine, in two variants.

In the similarly depicted known arrangement of FIG. 5, the de-energising voltage is presented by a close-coupled winding W of reversed sense to the sense of the phase winding $\phi$.

These power circuits and others previously proposed for reluctance motors intended for industrial drive applications have by and large shown no clear savings over the circuits used for induction or synchronous machines, as exemplified by the arrangement of FIG. 1, and all of the circuits illustrated in FIGS. 2 to 5 require substantially the same ratio of device kVA to machine input kW.

This latter point may be briefly enlarged upon, and in the following discussion, certain assumptions are made to simplify the argument. First of all, the reactive current which must be fed back into the supply in a practical arrangement, in order to de-energise the windings, is neglected. This amounts to neglecting the ratings of feedback diodes. A similar assumption, namely unity power factor, is made for the induction motor, for comparison of induction motor and reluctance motor power circuits on a like basis.

Device kVA is here defined as the product of maximum blocking voltage and average current, thus leaving no safety margin. Block inverter operation is also supposed.

Machine kW is taken as the product of d.c. rail voltage and the sum of the currents into the "top" devices, or the product of the d.c. rail voltage and the sum of the currents out of the "bottom" devices.

In FIGS. 1 to 3, each top switch "S" blocks the rail voltage only. The combined rating of the top switches therefore equates to the machine kW input. The same is true for the bottom switches. The total required device kVA rating is thus double the machine kW input.

In FIGS. 4 and 5, switch S must block twice the source voltage, for the usual case of exactly reversing the winding voltage during de-energisation. Thus again in this case, the required device kVA rating is double the machine kW input.

It may be emphasised that the above discussion represents a highly idealised and simplified argument, for the purpose of highlighting the principal problem underlying the present invention. More elaborate treatments of the subject, embracing in addition, the RMS rating of devices, may also be undertaken.

Thus so far as the power supply circuit is concerned, the mere substitution of a reluctance motor for a rotating field machine offers no appreciable saving in main switching devices, when circuit arrangements such as the known systems described above are employed.

While a lower device count is always advantageous, even though the total device kVA may be unchanged, the advantage gained may in some instances be offset by accompanying disadvantages, either by virtue of operational constraints or additional complexity in control, along with a possible associated cost penalty. Thus the arrangement of FIG. 2 may at first sight seem attractive, in that only four main switches are used, but severe constraints on the currents allowable at low speeds are required in order to keep the centre rail in balance. Also all four devices $S_1$ to $S_4$ must be capable of switching at the PWM frequency, and the circuit suffers from having no freewheel paths, leading to unacceptably high losses at part speeds.

Figure 6A:
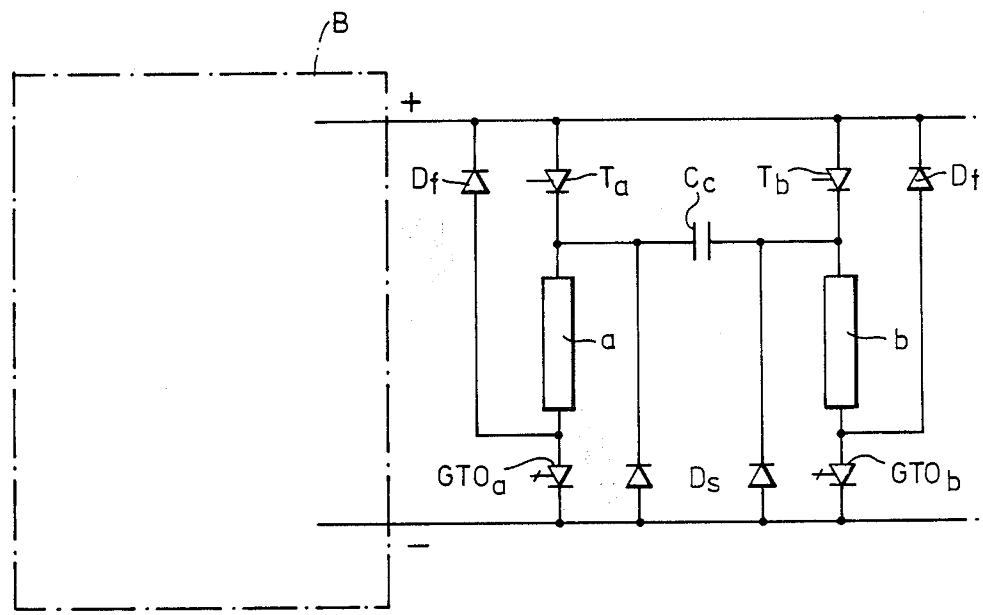
Figure 6B:
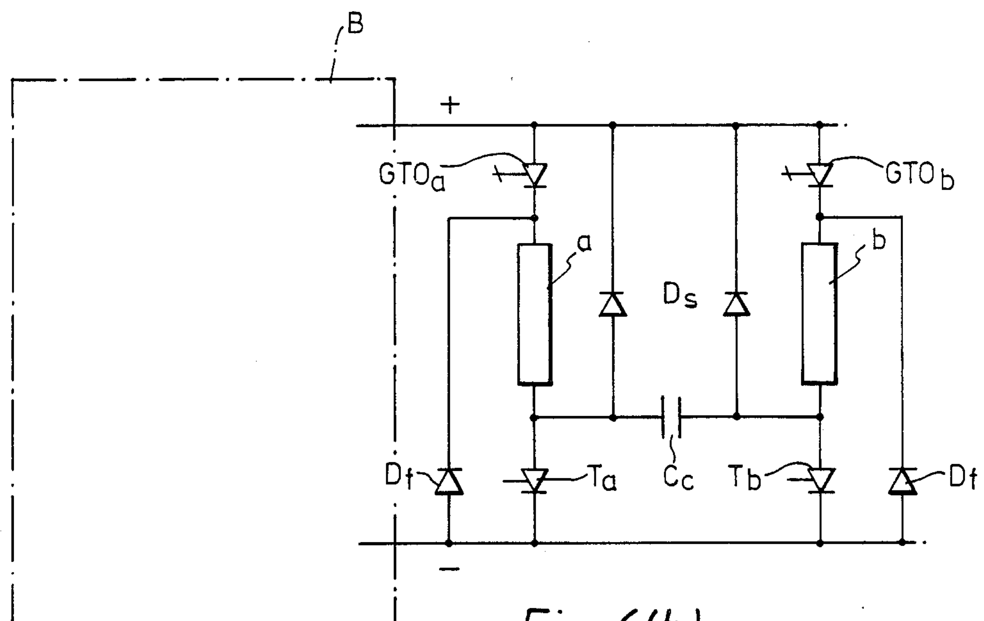

A first embodiment of power supply circuit according to the invention is shown in FIG. 6(*a*). Top and bottom rails are typically supplied by a diode bridge B. Each phase winding is disposed between top and bottom rails and is switched at the bottom by a first device in the form of a GTO thyristor. Alternatively a pure transistor may be used instead of the GTO (gate turn-off) thyristor. In association with a first diode $D_f$, this arrangement provides for PWM switching at the bottom, i.e. between the bottom rail and the phase winding. At the top end, a slow thyristor T, i.e. a thyristor characterised by a relatively long turn-off time, such as finds application in line-commutated situations, serves to connect each phase winding to the top rail, and, in conjunction with a respective slow diode $D_s$, the configuration allows one switching action at the top end per excitation of the respective phase winding, i.e. one switching action per working stroke. Each slow turn-off device T is force-commutated and switched off by energisation of the other phase. Thus when $T_a$ is conducting and $GTO_b$ is switched on, $T_a$ is switched off. Top end commutation is achieved by the single commutating capacitor $C_c$ which links across between the lower sides of slow devices T. No active auxiliary devices are required.

FIG. 6(*b*) represents a variant of the configuration of FIG. 6(*a*) in which the arrangement is substantially inverted, so that the fast devices $GTO_a$ and $GTO_b$ are located between the top rail and the phase windings, while the slow devices $T_a$ and $T_b$ and their associated features are at the bottom end. This variant functions in substantially equivalent manner to the circuit of FIG. 6(*a*).

Both FIG. 6(*a*) and FIG. 6(*b*) depict substantially idealised circuit configurations incorporating the essential features of the invention and containing a substantial mimimum of components necessary for carrying it out. Practical embodiments of the circuits may advantageously include reverse-connected diodes of relatively low power across each slow device as well as an inductor in series with capacitor $C_c$.

Figure 7:
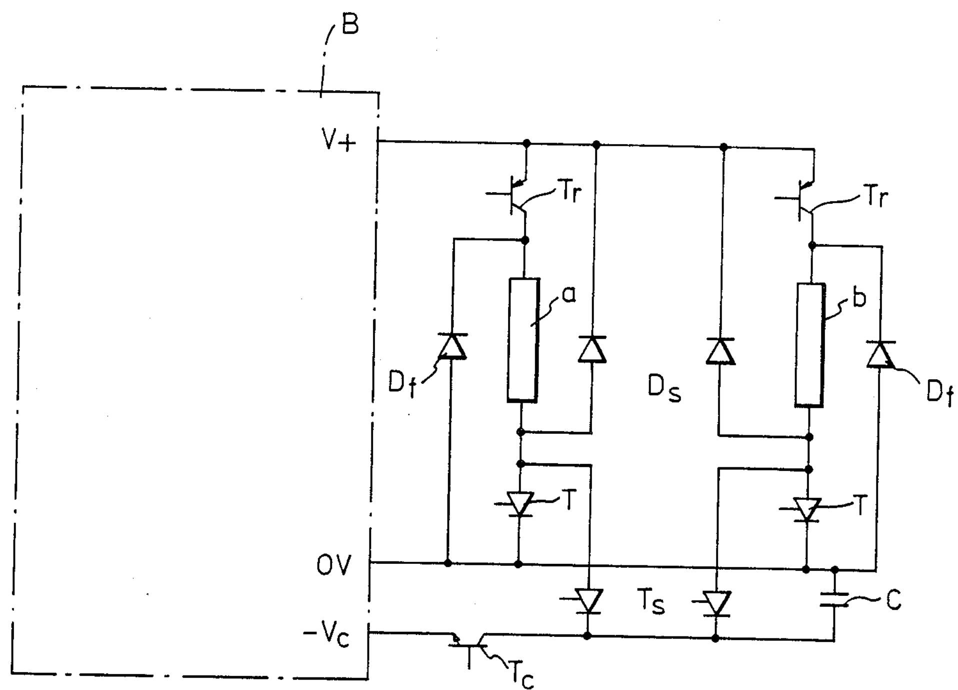
FIG. 7 shows a second embodiment of power circuit according to the invention, again for a two-phase reluctance motor.

In the alternative embodiment of power supply system according to the invention shown in FIG. 7, the top end devices are transistors $T_r$. Other features of the circuit are the same as those of FIG. 6(*b*), apart from the bottom-end commutation which is in this instance from a low-voltage d.c. auxiliary supply ($-V_c$), for example, of approximately 12 volts, via a pair of low power steering thyristors $T_s$ and a single transistor $T_c$. Alternatively $T_c$ may be replaced by a GTO thyristor. A single-phase variant may be visualised by removing phase "b" from FIG. 7, together with its associated transistor, diodes, thyristor and commutation steering thyristor $T_s$.

The circuits of FIGS. 6(*b*) and 7 act as step-down choppers when the bottom end thyristors T are left conducting, and as step-up choppers after thyristors T have been commutated. Thus the phase windings "a" and "b" of a reluctance motor, as shown in FIGS. 6 and 7, may be sequentially excited and de-excited, with continuous control of current waveshape.

The switch-on points and the duration and waveshape of energisation of each device GTO or $T_r$ may be controlled by suitable sensor means, such as a drive shaft angle transducer. Alternatively the switch-on and switch-off points may be inferred electrically without use of physical sensor means. In either event, controlled current may be forced on the windings according to a programmed pattern.

The two-phase embodiments described above represent especially advantageous implementations of the principles of the invention from the point of view of substantial minimisation of the number of components and the cost of the power supply system. In this regard, the circuit of FIG. 7 represents a marginally less advantageous arrangement, in that while capacitor C may be of relatively low value, compared with capacitor $C_c$ of FIG. 6, and is thus relatively inexpensive, an additional transistor together with two further small thyristors are used, as compared with the arrangement of FIG. 6.

Figure 8:
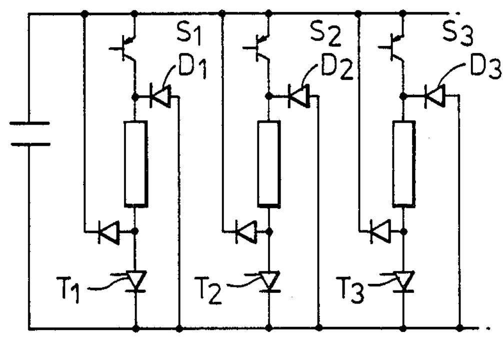
FIG. 8 is a schematic diagram showing application of the principles of the invention to a three-phase reluctance machine.

In a three-phase arrangement of power supply circuit incorporating the principles of the invention, as shown in FIG. 8, which is similar to FIG. 7, other than in regard to the number of phases, only three fast switching devices capable of operating at PWM frequency are required, these being located between the top rail and the phase windings. The three devices provided at the bottom, between the windings and the bottom rail, may be of slow-speed line-commutation quality, and thus of low cost. Paths for free-wheeling may be established by commutating the S or top devices, but the bottom devices are not so commutated.

The combination of high and low performance devices in a single power supply circuit for a reluctance motor provides an asymmetrical arrangement using one fast switch-off device and one slow switch for each phase. This asymmetry is acceptable in such a power circuit, in that unidirectional currents are in question, whereas in rotating-field machines, current reversal normally necessitates a symmetrical arrangement and thus two fast switches for each winding.

The two-phase embodiments described may also be employed in a four-phase configuration incorporating two two-phase supplies operating together. The two-phase embodiments are also especially suited to use in drive systems incorporating reluctance motors such as are disclosed in our co-pending patent application Ser. No. 816,867 entitled "Electrical drive systems incorporating variable reluctance motors".

We claim:

1. A power supply system for a reluctance motor having a plurality of phase windings, each of which has a first end and a second end, comprising (a) first and second supply rails between which said plurality of phase windings may be connected, (b) voltage source means for maintaining a supply voltage between said first and said supply rails, (c) first switch means for each of said plurality of phase windings each said first switch means directly connecting the first end of the respective phase winding to said first supply rail without the interposition of any other electrical circuit element, and each said first switch means being a self-commutating, fast switch-off device, (d) second switch means for each of said plurality of phase windings for connecting the second end of the respective phase winding to said second supply rail, each said second switch means being a device requiring forced commutation, (e) an auxiliary supply rail, (f) auxiliary voltage source means for maintaining a voltage between said auxiliary supply rail and said second rail which is substantially less than supply voltage, and (g) commutation means for effecting switch-off of each said second switch means, said commutation means being defined by a respective low-power thyristor connected between said second end of each of said plurality of phase windings and said auxiliary supply rail and a single self-commutating device connected in said auxiliary supply rail between said auxiliary voltage source and the points of connection of said low-power thyristors to said auxiliary supply rail.

2. A power supply system for a two-phase reluctance motor having first and second phase windings, each of which has a first end and a second end, comprising (a) first and second supply rails between which said first and second windings may be connected, (b) first switch means for each of said first and second phase windings for connecting the first end of the respective phase winding to said first supply rail, each said first switch means being a self-commutating, fast switch-off device, (c) second switch means for each of said first and second phase windings for connecting the second end of the respective phase winding to said second supply rail, each said second switch means being a thyristor, and (d) commutation means for effecting switch-off of each said second switch means, said commutation means being defined by a capacitor connected between the respective second ends of said first and second phase windings, so that in operation of the system the thyristor connected between the second end of the first phase winding and the second supply rail is force-commutated by energisation of the second phase winding and the thyristor connected between the second end of the second phase winding and the second supply rail is force-commutated by energisation of the first phase winding, each thyristor thereby undergoing one switching action for each working stroke of the respective phase.

3. A power supply system for a two-phase reluctance motor having first and second phase windings, each of which has a first end and a second end, comprising (a) first and second supply rails between which said first and second windings may be connected, (b) voltage source means for maintaining a supply voltage between said first and second supply rails, (c) first switch means for each of said first and second phase windings, each said first switch means directly connecting the first end of the respective phase winding to said first supply rail without the interposition of any other electrical circuit element, and each said first switch means being a self-commutating, fast switch-off device, (d) second switch means for each of said first and second phase windings for connecting the second end of the respective phase winding to said second supply rail, each said second switch means being a device requiring forced commutation, (e) an auxiliary supply rail, (f) auxiliary voltage source means for maintaining a voltage between said auxiliary supply rail and said second rail which is substantially less than said supply voltage, and (g) commutation means for effecting switch-off of each said second switch means, said commutation means being defined by a respective low-power thyristor connected between said second end of each of said first and second phase windings and said auxiliary supply rail and a single self-commutating device connected in said auxiliary supply rail between said auxiliary voltage source and the points of connection of said low-power thyristors to said auxiliary supply rail.

4. A drive system incorporating a reluctance motor having first and second phase windings, each of which has a first end and a second end, and a power supply system for said reluctance motor comprising (a) first and second supply rails between which said first and second windings may be connected, (b) voltage source means for maintaining a supply voltage between said first and second supply rails, (c) first switch means for each of said first and second phase windings, each said first switch means directly connecting the first end of the respective phase winding to said first supply rail without the interposition of any other electrical circuit element, and each said first switch means being a self-commutating, fast switch-off device, (d) second switch means for each of said first and second phase windings for connecting the second end of the respective phase winding to said second supply rail, each said second switch means being a device requiring forced commutation, (e) an auxiliary supply rail, (f) auxiliary voltage source means for maintaining a voltage between said auxiliary supply rail and said second rail which is substantially less than said supply voltage, and (g) commutation means for effecting switch-off of each said second switch means, said commutation means being defined by a respective low-power thyristor connected between said second end of each of said first and second phase windings and said auxiliary supply rail and a single self-commutating device connected in said auxiliary supply rail between said auxiliary voltage source and the points of connection of said low-power thyristors to said auxiliary supply rail.

5. A drive system incorporating a reluctance motor having first and second phase windings, each of which has a first end and a second end, and a power supply system for said reluctance motor comprising (a) first and second supply rails between which said first and second windings may be connected, (b) first switch means for each of said first and second phase windings for connecting the first end of the respective phase winding to said first supply rail, each said first switch means being a self-commutating fast switch-off device, (c) second switch means for each of said first and second phase windings for connecting the second end of the respective phase winding to said second supply rail, each said second switch means being a thyristor, and (d) commutation means for effecting switch-off of each said second switch means, said commutation means being defined by a capacitor connected between the respective second ends of said first and second phase windings, so that in operation of the system the thyristor connected between the second end of the first phase winding and the second supply rail is force-commutated by energisation of the second phase winding and the thyristor connected between the second end of the second phase winding and the second supply rail is is force-commutated by energisation of the first phase winding, each thyristor thereby undergoing one switching action for each working stroke of the respective phase.

* * * * *